United States Patent [19]

Veaux et al.

[11] Patent Number: 4,681,284

[45] Date of Patent: Jul. 21, 1987

[54] LANDING GEAR HAVING TANDEM WHEELS AND INDEPENDENT SHOCK ABSORBERS

[75] Inventors: Jacques Veaux, La Liberté ; Michel Derrien, Parc de Clagny, both of France

[73] Assignee: Messier-Hispano-Bugatti, Montrouge, France

[21] Appl. No.: 730,790

[22] Filed: May 6, 1985

[30] Foreign Application Priority Data

May 15, 1984 [FR] France .................. 84 07488

[51] Int. Cl.⁴ .......................... B64C 25/14
[52] U.S. Cl. .............................. 244/102 R
[58] Field of Search ............... 244/102 R, 102 SS

[56] References Cited

U.S. PATENT DOCUMENTS

| 2,643,834 | 6/1953 | Watman | 244/102 SS |
| 2,941,755 | 6/1960 | Westcott | 244/102 R |
| 3,315,919 | 4/1967 | Perdue | 244/102 R |
| 4,422,604 | 12/1983 | Turiot | 244/102 R |

FOREIGN PATENT DOCUMENTS

| 497751 | 11/1953 | Canada | 244/102 SS |
| 1404499 | 5/1965 | France . | |
| 1441885 | 7/1976 | United Kingdom | 244/102 SS |
| 1475882 | 6/1977 | United Kingdom . | |

Primary Examiner—Galen Barefoot
Attorney, Agent, or Firm—McAulay, Fields, Fisher, Goldstein & Nissen

[57] ABSTRACT

Each rocking arm (9, 10) hinged to a shock absorber (7, 8) has a lateral extension (13, 14) extending at an acute angle a to one side of the shock absorber (7, 8). This extension (13, 14) is connected by a telescopic strut (15, 16) to the opposite end (7A, 8A) of the same shock absorber (7, 8) in order to shorten said shock absorber when the landing gear is raised, thereby reducing the space it occupies in the raised position.

5 Claims, 2 Drawing Figures

LANDING GEAR HAVING TANDEM WHEELS AND INDEPENDENT SHOCK ABSORBERS

The invention relates to a retractable landing gear having wheels disposed in tandem and intended more particularly to be attached to the lower portion of an aircraft fuselage.

BACKGROUND OF THE INVENTION

So-called "tandem" landing gears are already known. The Applicant has been manufacturing and selling numerous types for many years. However, not all of them are compatible with the available fixing points on various kinds of aircraft structure.

The main object of the invention is to provide fuselage landing gear of the type having wheels in tandem and which is raised in a plane parallel to the fuselage, said landing gear being of simplified design and being as light as possible so that when raised the landing gear occupies as small a volume as possible.

SUMMARY OF THE INVENTION

The present invention provides a retractable landing gear having at least one wheel, and preferably two wheels mounted in tandem disposed in a single plane and suitable for being raised in said plane, wherein the landing gear includes, in combination with each wheel, a wheel lever carrying said wheel, a rocking arm hinged to the fuselage at a point higher than that at which the wheel lever is hinged thereto, a shock absorber extending between the free end of the rocking arm and the free end of the wheel lever, a connection rod interconnecting the two rocking arms, and an actuator connected to one of the rocking arms or to the connection rod, each rocking arm being provided with a lateral extension at its end which is hinged to the corresponding shock absorber, said extension extending from the side where there is an obtuse angle between said rocking arm and the shock absorber when the landing gear is retracted, with a telescopic link of predetermined maximum length having one end hinged to said lateral extension and having its other end linked to the other end of the shock absorber in the vicinity of the wheel, the said end of each lateral extension having a position which corresponds to maximum extension of the shock absorber when the landing gear is extended and a position which corresponds to maximum retraction of the same shock absorber when the landing gear is retracted and without loading the wheel.

Preferably, when the landing gear is extended, each rocking arm and its associated shock absorber combination lies along a broken line to one side of a straight line extending from the hinge between the shock absorber and the wheel lever and the hinge between the rocking arm and the fuselage, and when the landing gear is retracted each rocking arm and corresponding shock absorber combination is located on the other side of the same straight line. Advantageously, the said broken line differs only slightly from the straight line.

The invention does not interfere with the number of wheels adopted for making up the landing gear. It is compatible with the use of single wheel or with a plurality of wheels in tandem.

BRIEF DESCRIPTION OF DRAWINGS

An embodiment of the invention is described, by way of example, with reference to the accompanying drawings, in which.

MORE DETAILED DESCRIPTION

Figure 1:
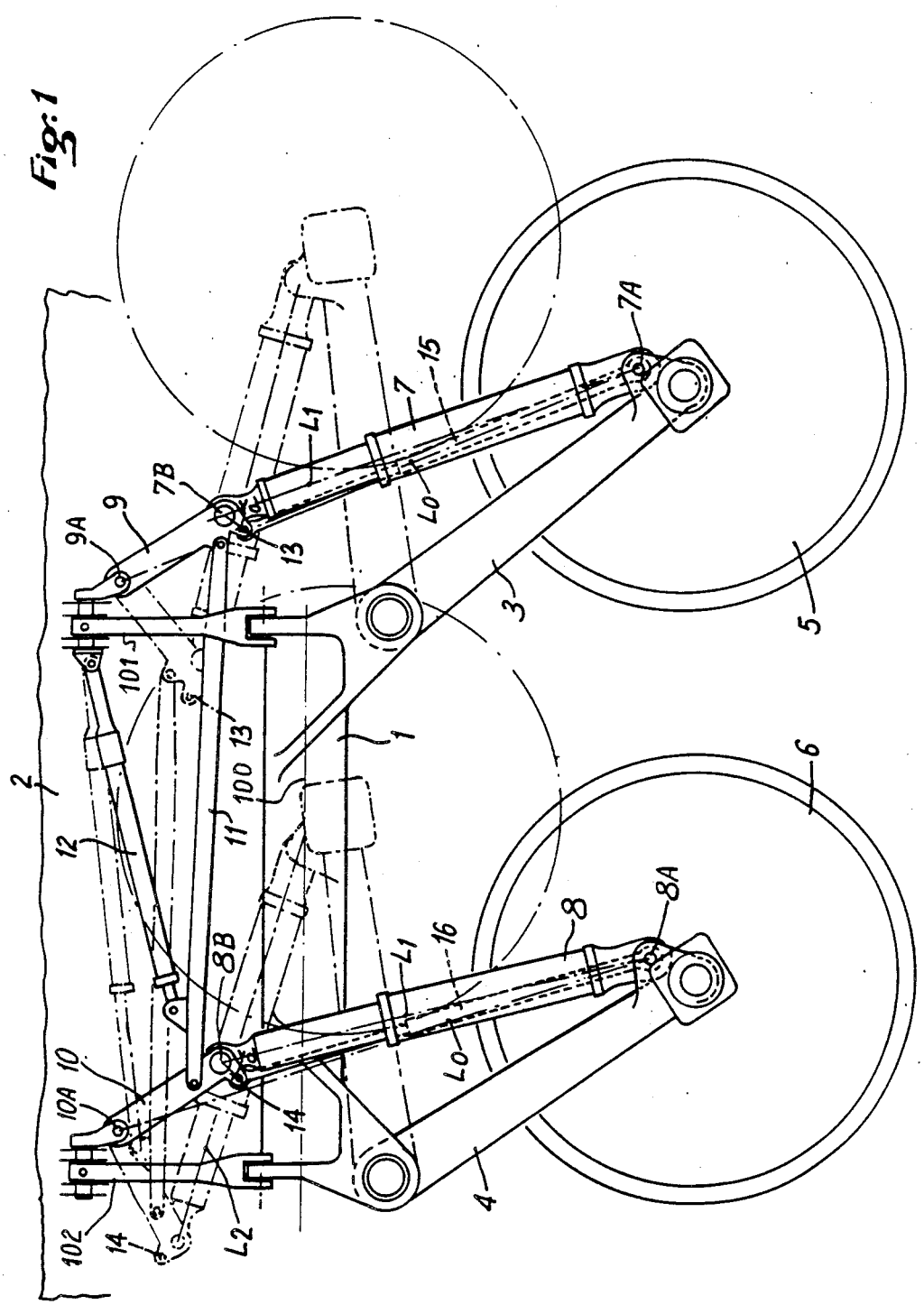
FIG. 1 is a side view of a landing gear in accordance with the invention, its extended position is shown by solid lines and its retracted position is shown by dot-dashed lines.
Figure 2:
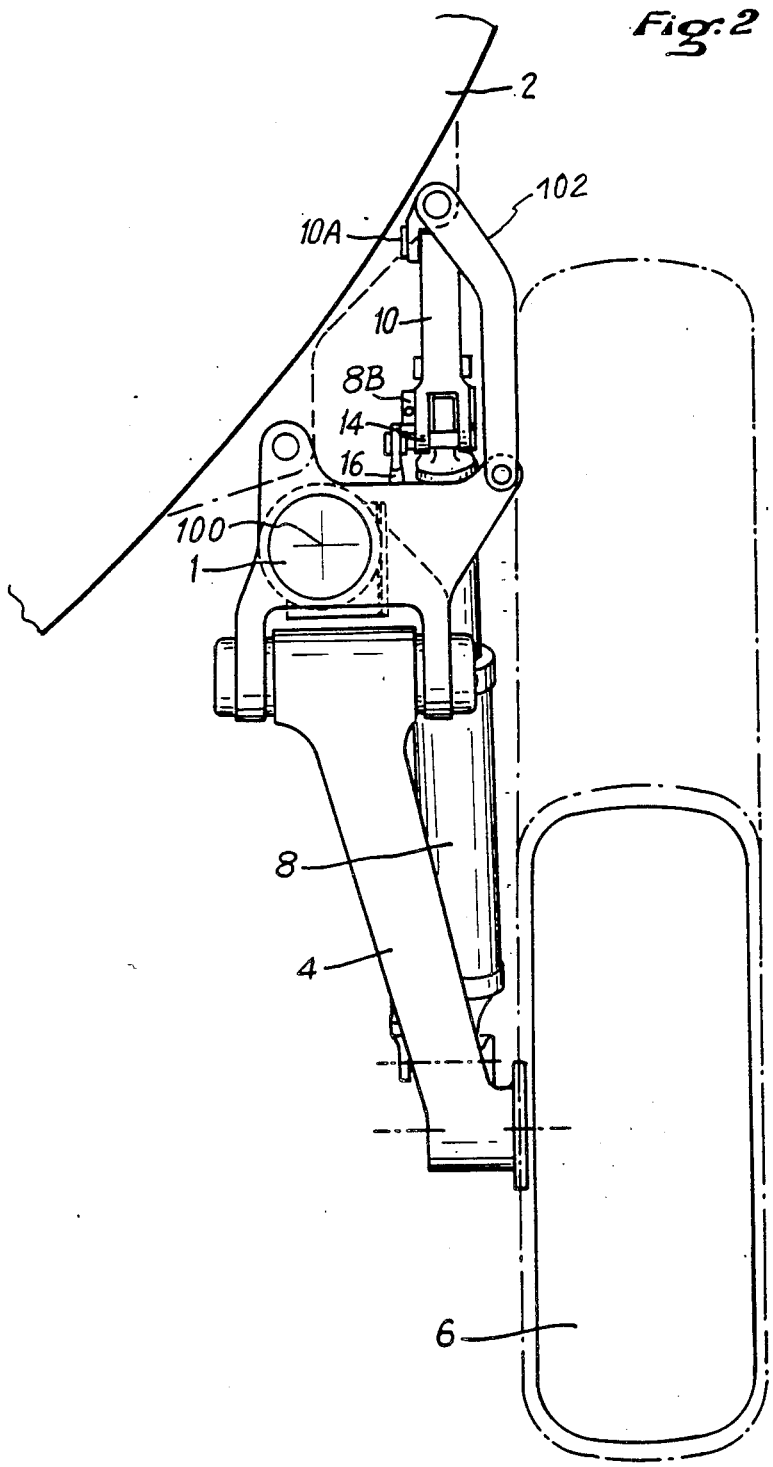
FIG. 2 is a front view of the FIG. 1 landing gear.

In the following detailed description, the term "landing gear" is used to designate a set of two retractable wheels mounted in tandem on one side of an aircraft fuselage. Naturally, the fuselage must be fitted with symmetrically disposed landing gear on its other side.

In the example herein described, the landing gear is attached to the fuselage by means of members suitable for fixing the landing gear to two of the main frames of the fuselage. The landing gear comprises a longitudinal beam 1 which is solidly fixed parallel to the fuselage 2 along an axis 100 by said fixing members, and the top ends of first and second wheel levers 3 and 4 are hinged to respective opposite ends of the beam 1. The bottom ends of the wheel levers 3 and 4 carry respective wheels 5 and 6. The bottom ends of the wheel levers are also hinged to the bottom ends of respective shock absorbers 7 and 8 in the vicinity of the wheel axes. The shock absorbers are preferably oleo-pneumatic struts having a double throttling effect, as is known per se.

Respective rocking arms 9 and 10 are hinged to the fuselage 2 above the points at which the wheel levers are hinged thereto, and the opposite ends of the rocking arms, i.e. their lower ends, are hinged to the top ends of the corresponding shock absorbers 7 and 8.

Each wheel 5 or 6, together with the corresponding lever arm 3 or 4, shock absorber 7 or 8, and rocking arm 9 or 10 constitutes a retractable assembly. As is shown below, the invention may be used with a single one of such assemblies, or with more than two, e.g. three, which are retractable in the plane that they occupy in the landing position.

When two such assemblies are used, as in the embodiments described herein, a connecting rod 11 is hinged to the two rocking arms 9 and 10 in such a position as to be parallel to the fuselage 2. A hinged parallelogram is thus obtained which is capable of being deformed by an actuator 12 having one end hinged to the fuselage 2 and having its other end hinged either to the connecting rod 11 close to where it is hinged to the rocking arm 10, or else, in a variant, directly to the rocking 10. When only one above-defined assembly is used, the actuator 12, or any equivalent drive means, is hinged directly to the rocking arm 10. When there are more than two such assemblies, the rocking arms are intereconnected by the connecting rod 11 or by a plurality of successive connecting rods mounted in line.

When the landing gear is extended in the landing position, the actuator 12 is locked, e.g. by clamps, in a known manner. The actuator stabilizes the hinged parallelogram in a preferred configuration in which, for each assembly, the line running from the hinge 7A or 8A between the shock absorber 7 or 8 and the wheel lever 3 or 4, which passes via the hinge 7B or 8B of the same shock absorber 7 or 8 with the rocking arm 9 or 10, and which ends at the hinge 9A or 10A between the rocking arm 9 or 10 and the fuselage 2, is a broken line L1 which is slightly offset from the straight line L0 which runs from the hinge 7A or 8A between the shock absorber 7 or 8 and the wheel lever 3 or 4 and the hinge 9A or 10A between the rocking arm 9 or 10 and the fuselage 2. The broken line L1 lies on one side of the straight line L0. When the actuator 12 is operated to raise or retract the landing gear, it acts in such a direction that the broken line L1 moves closer to the straight line L0, overlaps said line, and then passes to the other side thereof to constitute a second broken line L2 having an outwardly directed obtuse angle as shown in dot-dashed lines in FIG. 1.

Each rocking arm 9 and 10 is provided with lateral extension 13, 14 at its end which is hinged at 7B or 8B with the corresponding shock absorber 7, 8. The extension 13 or 14 is situated on the same side of the broken line L1 as the exterior obtuse angle as defined above in the retracted position of the landiing gear.

A telescopic strut 15, 16 is hinged at one end with the lateral extension 13, 14 of each rocking arm 9, 10 and at its other end about the hinge axis 7A or 8A of the shock absorber 7 or 8 with the wheel lever 3 and 4 which is suitably extended to receive the telescopic strut. Each of the telescopic struts 15 and 16 has a maximum length which correspoonds to the maximum length of the shock absorber 7 or 8 with which it is associated; each telescopic strut may shorten in length in order to accompany the shock absorber during operation thereof.

Each lateral extension 13, 14 is disposed so that its free end, when the landing gear is extended, occupies a position enabling maximum extension of the shock absorber 7, 8 during landing, and in contrast it occupies a position when the landing gear is retracted which corresponds to major, and preferably maximum, retraction of the shock absorber without loading the corresponding wheel.

In the present example, when the landing gear is extended each lateral extension 13, 14 from each rocking arm 9, 10 extends in a direction make an acute angle a with the geometrical axis L2 of the corresponding shock absorber 7, 8.

This acute angle a is chosen to have a value such that when the landing gear is raised or retracted, each lateral extension 13, 14 lies in a direction which is substantially parallel to the direction of the geometrical axis of the corresponding shock absorber 7, 8 and in the opposite direction thereto, whereby each telescopic strut 15, 16 exerts on the shock absorber 7,8 a traction force to shorten the shock absorber as can readily be seen in FIG. 1.

Advantageously, at least one of the hinges 9A or 10A is connected to the beam 1 by a stiffener 101, 102 connecting the corresponding hinge 9A, 10A to the beam 1 so that the stiffeners 101, 102 enable a rigid landing gear to be constituted which does not require reinforced fixing points since all the forces to which the landing gear is subjected are essentially absorbed by the beam.

The raised landing gear thus occupies a minimum amount of space; this result is obtained by extremely simple means which do not significantly increase the weight, the volume or the expense of the landing gear.

We claim:

1. A retractable landing gear having at least two wheels mounted in tandem in a single plane, for an aircraft having a fuselage, said landing gear being retractable into said fuselage in a maximum retraction condition, wherein:

said landing gear comprises a longitudinal beam solidly fixed parallel to said fuselage;

a wheel lever for each said wheel, said wheel lever having top and bottom ends which is hinged by its top end to said beam, respectively to the opposite ends of said beam; and a rocking arm for each said wheel and having a lower end;

a respective shock absorber for each said wheel hinged at its bottom end to the bottom end of said wheel lever, the opposite end of said shock absorber being hinged to a lower end of said rocking arm which has a pivotal connection with said fuselage at a point on its upper end, both said rocking arms being connected by a parallelogram-shaped hinge constituted by a connecting rod parallel to said fuselage;

an actuator having one end hinged to said fuselage and its other end hinged to either said rocking arm or to said connecting rod; and each of said rocking arms having a lateral extension near or at its lower end and a telescopic strut articuled with said extension and with said bottom end of said shock absorber to cause said shock absorber to shorten to a maximum retraction condition when said landing gear is retracted by said actuator into said fuselage.

2. A retractable landing gear according to claim 1, wherein said longitudinal beam is solidly fixed parallel to said fuselage by at least one stiffener link means to the same fixing point that said respective rocking arm has a pivotal connection with said fuselage.

3. A retractable landing gear according to claim 1, wherein each said rocking arm and each said shock absorber in the extended position of the landing gear is situated on a broken line having an obtuse angle on one side, on which side said lateral extension is provided to one side of a straight line connecting the hinge between the shock absorber and the wheel lever and the hinge between the rocking arm and the fuselage, and in the retracted position the same rocking arm and the same shock absorber are situated on the other side of the same straight line.

4. A retractable landing gear according to claim 1, wherein each said lateral extension extends, when the landing gear is extended, in a direction which makes an acute angle a with the geometrical direction of the corresponding shock absorber.

5. A retractable landing gear according to claim 4, wherein the actute angle a is chosen to have a value such that in the retracted position of the landing gear each lateral extension extends in a direction which is substantially parallel to the direction of the geometrical axis of the corrsponding shock absorber and in the opposite direction thereto relative to the hinge between said shock absorber and the rocking arm.

* * * * *